United States Patent [19]

Aren

[11] Patent Number: 4,476,612

[45] Date of Patent: Oct. 16, 1984

[54] GRIPPING UNIT

[75] Inventor: Björn G. A. Aren, Kalix, Sweden

[73] Assignee: Stiftelsen Prodinor, Lulea, Sweden

[21] Appl. No.: 379,317

[22] Filed: May 18, 1982

[30] Foreign Application Priority Data

May 18, 1981 [SE] Sweden ............................... 8103082

[51] Int. Cl.3 ............................................ F16B 11/00

[52] U.S. Cl. ......................................... 24/304; 24/297; 403/270

[58] Field of Search ................ 24/263 DT, 22, 243 R, 24/304, 306, 297, 17 AP; 403/270; 49/440

[56] References Cited

U.S. PATENT DOCUMENTS

| | | | |
|---|---|---|---|
| 1,088,182 | 2/1914 | Rielly | 24/263 D |
| 2,288,851 | 7/1942 | Sharp | 24/263 DT |
| 2,412,796 | 12/1946 | Bascom | 49/440 |
| 2,502,970 | 4/1950 | Manning | 403/270 |
| 2,643,433 | 6/1953 | Scott | 24/297 |
| 3,037,596 | 6/1962 | Fordyce | 24/297 |
| 3,230,592 | 1/1966 | Hosea | 24/297 |
| 3,494,006 | 2/1970 | Brumlik | 24/306 |
| 3,872,548 | 3/1975 | Bryant et al. | 24/304 |
| 4,074,465 | 2/1978 | Bright | 24/289 |

FOREIGN PATENT DOCUMENTS

| | | |
|---|---|---|
| 380915 | 10/1964 | Switzerland . |
| 2019810 | 11/1979 | United Kingdom . |

*Primary Examiner*—Victor N. Sakran
*Attorney, Agent, or Firm*—Burns, Doane, Swecker & Mathis

[57] ABSTRACT

A gripping unit (1) intended by mechanical contact to be caused to interact with an object (2) for the purpose of maintaining a gripping surface (3) belonging to the gripping unit in a fixed position relative to the object, said gripping unit including on the one hand a number of gripping elements (4) and on the other hand a gripping element support (5) connected to the gripping elements, in which the surface (3) of the gripping unit facing the object is in the form of one or more hard, gripping elements (4). Each gripping element (4) is joined directly to the gripping element support (5) by a metallurgical atomic bond. The material used for the gripping element support (5) is selected so as to exhibit considerable elastic rigidity and having the same or essentially the same modulus of elasticity as the material used for the gripping element (4).

11 Claims, 20 Drawing Figures

σ
ε
a
b
c
d
e
f
g

2'

2"

A

5'

GRIPPING UNIT

TECHNICAL FIELD

The present invention relates to a gripping unit, and in particular to that type of gripping unit intended to be caused by means of mechanical contact to interact with an object, for the purpose of maintaining a gripping surface belonging to the gripping unit in a fixed position relative to the object, said gripping unit including on the one hand a number of gripping elements and on the other hand a gripping element support connected to the gripping elements, in which the surface of the gripping unit facing the object is in the form of one or more hard, gripping elements.

DESCRIPTION OF THE PRIOR ART

In relation to one embodiment of a gripping unit of the nature indicated above, a previously disclosed method involves forming the gripping elements of the gripping unit from a hard material. The reason for choosing the hard material is that this is able to provide high contact pressure at the contact surface or contact surfaces with the object which is to be maintained in a fixed position or gripped.

Previously disclosed is the method of forming the gripping elements in such a way and of selecting the contact pressure in such a way that the object being gripped is deformed, and many gripping units are actually designed to utilize this principle.

Also previously disclosed is the principle used in relation to gripping units of the design referred to above of arriving at a compromise between the fact that a high contact pressure is essential and the fact that the contact surface must be sufficiently large to permit the combined gripping force to be sufficiently high in relation to a predetermined maximum contact pressure between the gripping unit and the object.

The description of the prior art must also include the view that, if a large contact surface is specified between the gripping unit and the object, and if the gripping unit is not of a shape which matches that of the object, then either or possibly both, i.e. the gripping unit and the object, must change their shape under the effect of the force which is applied. Thus it is obvious that a solid, hard gripping unit would not only deform the object locally, but that the gripping unit would also change its own macroscopic form.

Previously disclosed in Swiss Patent Specification No. 380 915 is a gripping unit which incorporates a hard, gripping surface, said gripping surface being applied to an elastic deformable supporting device, said supporting device being so arranged as to be capable of moving the gripping element causing it to interact with the object or to cease interacting with the object.

Also previously disclosed in English Patent Specification No. 2,019,810 is a method of designing a gripping unit to interact with an object, said gripping unit exhibiting a number of hard gripping elements located freely adjacent to each other in the gripping element support, said gripping elements thus being capable of being removed from the gripping element support in a simple manner for replacement in the event of wear.

DESCRIPTION OF THE PRESENT INVENTION

Technical Problem

A qualified technical problem is associated with being able to limit the gripping forces between the gripping elements and the object in such a way that this gripping force exceeds the desirable gripping force by only a small margin.

Two important reasons also exist for limiting the gripping force which a solid, hard gripping unit may be allowed to apply to the object.

One reason is that macroscopic deformation is not always acceptable in the object being gripped, and the other reason is that local stress concentrations in the hard, and thus generally brittle gripping unit could result in the gripping elements breaking up.

These considerations have revealed that a qualified technical problem is associated with creating conditions such that an acceptable level of contact pressure is actually applied over a large contact surface, and with ensuring that the gripping unit is made flexible, thereby enabling the desired load distribution to be present over the entire contact surface.

The term 'flexible' is used in this context to indicate that the shape of the gripping unit may be modified, i.e. that it may be exposed to plastic deformation rather than to elastic deformation.

Experiences gained in practice suggest that previously disclosed flexible gripping units, in which the flexibility is provided by building up the gripping unit from hard gripping elements which are flexibly attached in relation to each other, and in which the flexibility is provided either by means of mechanically articulated joints or by means of a high degree of elasticity in those parts of the gripping unit which hold together the various gripping elements, are not entirely suitable for solving the problem referred to above.

Problems have also been encountered in conjunction with gripping units attached to articulated tongs, since the ability of the gripping unit to modify its shape is severely restricted by the need to limit the number of articulated links in the gripping unit.

A major disadvantage of previously disclosed gripping units with a quite soft material as the gripping element support, for instance rubber, and with hard gripping elements let into the working surface, is the severely limited force which a gripping unit of given dimensions can apply. Investigations carried out in conjunction with this have shown that the problem is probably linked with the fact that the elastic, flexible parts of the gripping unit have a considerably lower elastic rigidity value than the elastic rigidity value of the hard gripping elments. Such a restriction of the gripping force available from a gripping unit of given structural design and dimensions will occur irrespective of the manner in which the elastic flexibility is achieved by the local use of materials with low specific elastic rigidity or by providing the gripping unit locally with a geometrically flexible shape.

A further qualified technical problem is associated with the creation of conditions such that the use of the gripping unit may occur irrespective of the operating temperature, which will very often be limited by the fact that mechanical stress or some other environmental factor in conjunction with a high temperature is able more easily to have a damaging effect on the geometric or elastic links in the gripping unit.

Solution

The present invention now proposes a gripping unit which is intended by means of mechanical contact to interact with an object for the purpose of maintaining a gripping surface belonging to the gripping unit in a fixed position relative to the object, said gripping unit including on the one hand a number of gripping elements and on the other hand a gripping element support connected to the gripping elements, in which the surface of the gripping unit facing the object is provided with one or more hard gripping elements.

The present invention proposes that each gripping element shall be joined directly to the gripping element support by means of a metallurgical atomic bond, and that the material used for the gripping element support shall be selected so as to exhibit considerable elastic rigidity, having the same or essentially the same modulus of elasticity as the material used in the gripping element.

The present invention also suggests that each gripping element shall be joined to the gripping element support without an intermediate layer, i.e. by means of a diffusion bond.

The gripping element support shall be in the form of a plastic deformable material whose elastic rigidity value must be at least 30% of the rigidity value of the one or more gripping elements making up the unit. The technical effect of the present invention will likewise be present if the elastic rigidity value amounts to at least 50% of the rigidity value of the one or more gripping elements making up the unit. The present invention proposes that the rigidity value should preferably be at least 90%, or most suitably at least 95% of the rigidity value of the one or more gripping elements making up the unit.

The present invention also proposes that the shape of the gripping elements making up the unit and their positions on the gripping element support may be adapted to fit the object with which the gripping unit is intended to be used. It is also possible to create conditions such that the gripping unit as a whole is intended to be capable of being substituted for another type of gripping unit.

A particularly appropriate embodiment of the present invention requires the plastic deformable material to consist mainly of the same basic chemical substance as the one or more gripping elements making up the unit, thereby creating conditions under which powder pressing, hot compaction or other similar manufacturing processes may be used to produce a gripping unit designed in accordance with the present invention.

The scope of the invention also includes the possibility of including only a single gripping element in each gripping unit, in which case the gripping element is given such geometrical form that the gripping element support may undergo considerable deformation.

Advantages

The advantages which may be regarded as being characteristic of the present invention are that the gripping unit is in the form of a materially integrated body consisting of two or more materials with clearly distinguishable properties in which hard gripping elements are securely attached by means of a plastic deformable material in the gripping element support. The plastic deformable material may exhibit an elastic rigidity value and/or a thermal stability value which should preferably be of the same order of magnitude as the elastic rigidity value or the thermal stability value of the material used in the gripping element or gripping elements, and in which the desired flexibility of the gripping unit may, if required, be provided to a very high degree by the plastic deformation of the one or more components linking together the materials used in the gripping elements.

BRIEF DESCRIPTION OF THE ATTACHED DRAWINGS

A number of preferred embodiments of a gripping unit exhibiting the significant characteristics of the present invention are described in more detail with reference to the attached drawings, in which.

Figures 1, 2, 3, 4, 5, 6, 7, 8, 9, 10, 11:
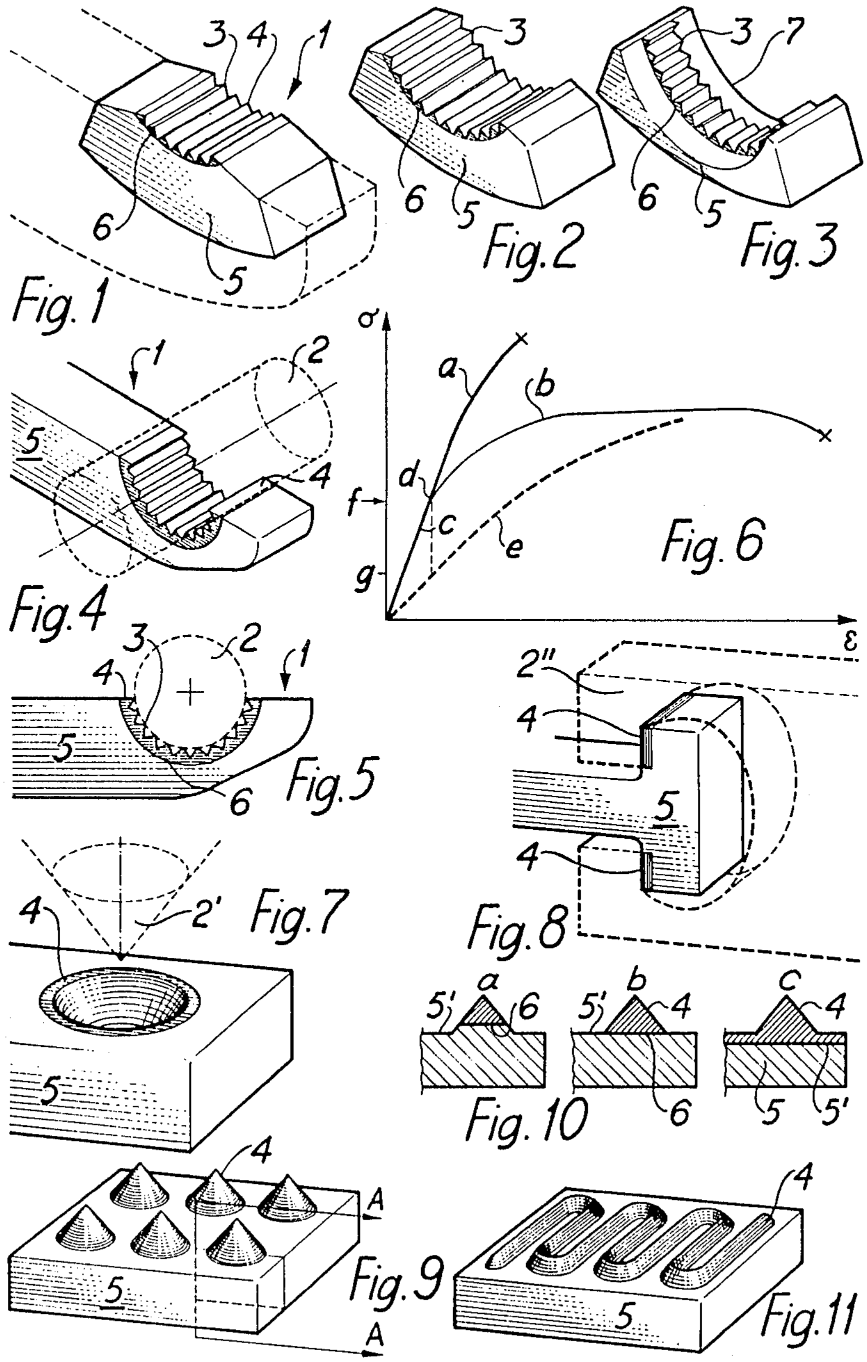
FIG. 1 is a perspective view of a gripping unit with the gripping elements and the gripping element support joined together to form a single item.
FIG. 2 is a view of an alternative embodiment of the gripping surface of the gripping unit in accordance with FIG. 1.
FIG. 3 is a view of a further alternative embodiment of the gripping surface of the gripping unit in accordance with FIG. 1.
FIG. 4 is a view of an embodiment in which the gripping elements are formed directly in a gripping unit in the form of a gripping element support and in which this interacts with an object.
FIG. 5 is a side view of the embodiment in accordance with FIG. 4.
FIG. 6 is a graph of the stress-strain curve for the materials making up the gripping unit.
FIG. 7 is a view of an alternative gripping unit.
FIG. 8 is a view of a further alternative gripping unit.
FIG. 9 is a perspective view of a number of gripping elements attached to a gripping element support.
Figure 12:
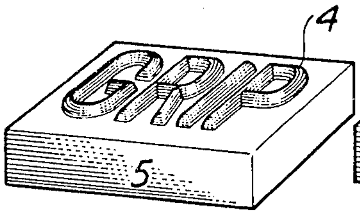
Figure 13:
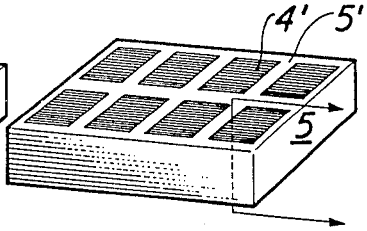
Figure 14:
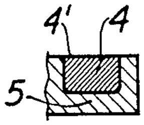
Figure 16:
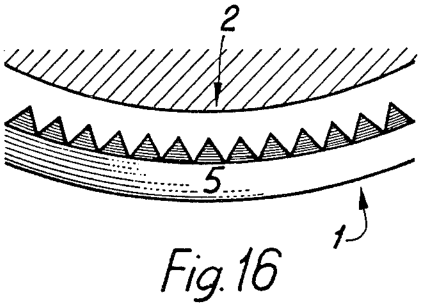
Figure 15:
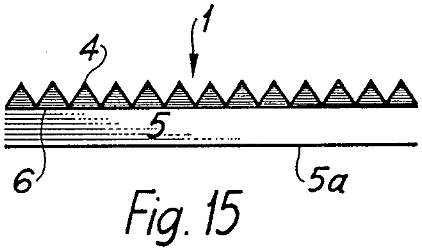
Figure 17:
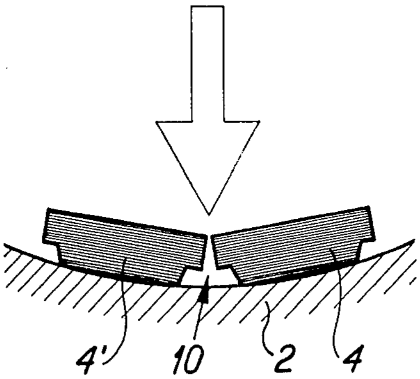
Figure 18:
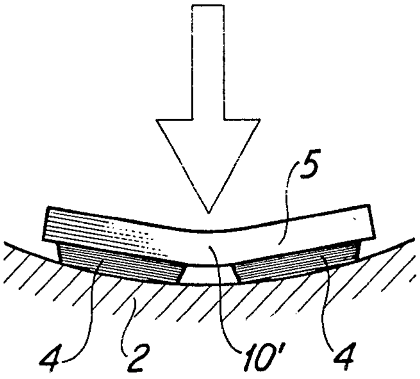

FIGS. 10*a*, 10*b* and 10*c* are sectional views of three different ways of locating the joining surface between the gripping elements and the gripping element support;

FIG. 11 is a perspective view of a gripping unit with a continuous gripping element;

FIG. 12 is a view another embodiment of a gripping unit with continuous, large closed and open gripping elements;

FIG. 13 is a perspective view of a gripping unit in which the gripping elements have been located on the same plane as the gripping element support;

FIG. 14 is a cross sectional view through the gripping unit in accordance with FIG. 13;

FIG. 15 is a transverse sectional view of a gripping unit in accordance with the present invention;

FIG. 16 is a cross sectional view illustrating the manner in which the shape of the gripping unit in accordance with FIG. 15 is modified when the gripping unit interacts with a curved object;

FIG. 17 is a view illustrating the crack formation which, under the conditions indicated in FIG. 16, may be assumed to occur if use is made of a previously disclosed gripping unit whose construction does not include the gripping element supports of a plastic deformable type which fall within the scope of the present invention; and FIG. 18 is a view of a modification of the shape which is characteristic of the present invention.

DESCRIPTION OF THE PREFERRED EMBODIMENT

FIG. 1 shows a perspective view of a gripping unit 1 intended to be caused by means of mechanical contact to interact with an object 2 (see FIG. 4), for the purpose of maintaining a gripping surface 3 belonging to the gripping unit in a fixed position relative to the object 2, said gripping unit including on the one hand a number of gripping elements 4 and on the other hand a gripping element support 5 connected to the gripping elements. The surface 3 of the gripping unit 1 facing the object 2 is in the form of one or more hard, gripping elements 4.

Each gripping elment is joined directly to the gripping element support 5 by means of a metallurgical atomic bond 6. The material used for the gripping element support is selected so as to exhibit considerable elastic rigidity, having the same or essentially the same modulus of elasticity as the material used in the gripping element. The meaning of the expression 'considerable elastic rigidity' will be indicated more precisely with reference to FIG. 6.

FIG. 2 shows an alternative embodiment of a gripping unit in which the gripping surface 3 is rather less curved than the gripping surface 3 in FIG. 1.

With regard to the embodiment in accordance with FIG. 3, this shows how the gripping surface 3 is in the form of a narrow strip, positioned in a hollow recess 7, with the width of the hollow recess 7 exceeding the width of the gripping surface 3.

As far as the embodiment in accordance with FIG. 4 is concerned, this shows how the entire gripping unit 1 is in the form of a gripping element support 5, and how the gripping elements 4 have been given a shape which directly matches the shape of the object 2. The interaction between the object 2 and the gripping unit 1 is shown in side view in FIG. 5.

The invention is distinguished by the fact that the gripping device 1 or the gripping unit 1 is executed in the form of a materially integrated body consisting of two or more materials with clearly distinguishable properties, and in which hard gripping elements 4 are securely attached to a plastic deformable material 5 with an elastic rigidity value and/or thermal stability value which should preferably be of the same order of magnitude as the elastic rigidity value or the thermal stability value of the material used in the gripping element 4. The desired flexibility of the gripping unit can, if required, be provided to a very great extent by the plastic deformation of the one or more components linking together the materials in the gripping element support 3.

The present invention is based on the belief that hard steel usually exhibits greater thermal stability than soft (plastic deformable) steel. Furthermore, the reference to thermal stability shall be regarded only as an example of the fact that other characteristics may also be taken into consideration when applying the unique features which are indicative of the present invention.

In one practical embodiment the gripping elements 4 may be produced from hard-tempered alloy steel at the same time as the flexible material 5 may be in the form of malleable low-carbon steel. It is, of course, assumed that the practical embodiments of the invention may exhibit considerable variations within the scope of the idea of invention.

The present invention proposes the possibility of causing hard, and therefore brittle gripping units, which are exposed during use to bending in order to fit curved shapes and may very easily break, this being particularly common in the case of engraved gripping units in which the engraving may contribute to local stress concentrations, to be attached to a gripping element support, thereby avoiding the risks indicated above but without reducing the capacity of the gripping device. The flexible gripping units have also been found to be considerably less sensitive to any dimensional errors which may occur during stressing.

The plastic formability proposed by the invention may also be utilized in such a way that new and previously unused gripping units with standardized geometry may easily be adapted for different tasks either by the practical use of the gripping unit or by means of a special forming operation. For example, a gripping unit made for a flat shape can be modified by permanently changing its shape to grip a curved surface.

Since the flexibility of the gripping unit in accordance with the present invention is essentially plastic in nature, this produces the effect that the geometrical fit of the gripping unit to the object being gripped is preserved to a very great extent even after the grip has been released. This means that when identical objects are to be gripped repeatedly, it will not normally be necessary to utilize the inherent plastic flexibility, which will, of course, save energy at the same time as protecting the material.

Although the most suitable embodiment involves causing a gripping unit to have two or more gripping elements which face each other and interact with each other, it should also be noted that the present invention is not restricted to an application of this kind, but that the present invention also covers the situation in which the gripping unit contains only a single gripping element.

A further unique feature is that a gripping unit manufactured in accordance with the present invention, and preferably in accordance with the embodiments illustrated in FIGS. 1-3, will find a practical application because the gripping unit in accordance with the invention is capable of being substituted in a simple manner for previously disclosed gripping units and of being incorporated in previously disclosed gripping devices.

FIG. 6 illustrates by means of a curve 'a' a stress-strain diagram for a hard-tempered material used in the gripping element 4. The reference designation 'b' indicates the curve for a plastic deformable material exhibiting considerable elastic rigidity used in the gripping element support 5.

The expression 'considerable elastic rigidity' means, in principle, that the two materials have the same or essentially the same modulus of elasticity, which is illustrated by the reference designation 'c' in FIG. 6.

A gripping unit in accordance with the present invention which, with regard to the gripping element 4 uses a material in accordance with 'a', and with regard to the gripping element support 5 uses a material in accordance with the curve 'b', will have a modulus of elasticity under load which will remain identical as far as the point 'd'. At a higher load, plastic deformation will occur in the material 'b'. By joining the gripping element 4 to the gripping element support 5 without an intermediate layer, i.e. by means of a diffusion bond, a change will occur in the shape of the material used for the gripping element support 5 as soon as the load increases beyond point 'd' in FIG. 6.

The present invention proposes that the gripping element support 5 should be in the form of a plastic deformable material whose elastic rigidity value must be at least 30% of the rigidity value of the one or more gripping elements 4 making up the unit. This may best be illustrated by the case in which the gripping element support 5 is in the form of a material in accordance with the curve 'e' in FIG. 6.

If it is assumed that the material 'a' is used for the gripping element 4 and that the material 'e' is used for the gripping element support 3, and that the gripping unit is loaded until the point 'f' is reached, then it is obvious that the stress on the material 'e' will have the value 'g'. Thus g/f must be at least 0.3.

The invention proposes that the elastic rigidity value of the gripping element support should be at least 50% of the rigidity value of the one or more gripping elements making up the unit. It is, of course, desirable for this rigidity value to be at least 90%, and preferably 95% of the rigidity value of the gripping elements making up the unit. The rigidity value may also be identical, of course.

FIG. 7 shows a perspective view of a gripping unit in accordance with the present invention, in which the gripping element support 5 is provided with a conical hollow recess in the form of a gripping element 4 and which is suitable for gripping a cone-shaped object 2'.

FIG. 8 shows another embodiment of a gripping unit in which the gripping element support 5 is in the form of a 'T' and in which flat surfaces of the gripping unit are provided with gripping elements 4. The gripping unit is suitable for gripping an object 2".

FIG. 9 shows a perspective view of a gripping unit in accordance with the present invention, in which the gripping element support 5 is provided on its upper surface with a number of gripping elements 4 in the form of cones. Thus the gripping unit in accordance with FIG. 9 is toothed. The hard teeth are integrated with a load-distributing base 5 of plastic formable material for the gripping element support of the nature already described. In the interests of clarity the attached Figures show the hard material component as a dark shaded area, whereas the plastic formable component appears as a light area.

FIG. 10 shows a section through the gripping unit in accordance with FIG. 9, by means of which it is able to illustrate the boundary layer between the hard gripping elements and the elastic formable gripping element support.

FIG. 10*c* shows that the boundary layer between hard gripping element material and formable gripping element support material lies below the upper surface of the body of the gripping unit; in this embodiment the gripping elements will form part of a common, continuous piece of hard material. By making those parts of the gripping element which connect together the various elements thin, this will permit elastic deformation of the gripping elements to occur, which in turn will enable flexibility to be present in the composite gripping unit. Any fracture which occurs in the hard, continuous part of the material will be filled as the result of the plastic deformation of the base and will not spread into the base.

FIG. 10*a* shows that the boundary layer is located slightly above the upper surface 5' of the gripping element support. FIG. 10*b* shows that the hard material used for the gripping elements has the layer 6 located adjacent to the upper surface 5' of the gripping element support 5.

FIG. 11 shows another embodiment in which the hard gripping element 4 has been given the form of a long, continuous line, said gripping element 4 being integrated with the gripping element support 5.

FIG. 12 shows an embodiment in which the gripping element has been given a variety of forms with both open and closed shape.

FIG. 13 shows an example of a gripping unit which is suitable for gripping objects with a smooth surface which may exhibit macroscopic irregularities, where gripping marks are not acceptable on the object being gripped. The surface 4 of the hard gripping elements lies in this instance on the same level as the upper surface 5' of the formable gripping element support 5, and FIG. 14 shows a section through part of the typical embodiment in accordance with FIG. 13.

Without being illustrated specifically, it is assumed that the gripping units may also have a structural design in which the surface 4' of the gripping elements lies below the plastic deformable material in the gripping element support 5.

FIG. 15 shows a gripping unit in accordance with the present invention in which the gripping element 4 is in the form of teeth and is integrated via a boundary zone 6 with a gripping element support 5. When said gripping unit 1 is caused to interact with an object 2 by means of a pressure which is distributed uniformly over the entire surface 5*a*, the gripping element support 5 will undergo plastic deformation, causing the gripping elements 4 to fit closely against the object 2 in the manner illustrated in FIG. 16. The gripping unit 1 will, as a result of the plastic deformation, retain the shape illustrated in FIG. 16.

A change in the shape of the gripping element by means of a plastic forming process may be found suitable in many applications as a better alternative than undertaking the desired more or less permanent change in the shape.

FIG. 17 shows a side view of how a previously disclosed gripping unit, having a gripping surface 4 integrally joined to an adjacent surface 4', may be caused to form cracks 10 between the gripping elements if the gripping elements are caused to interact with an object 2 with a shape which differs from the position and shape of the gripping elements.

FIG. 18 shows the technical effect of a gripping unit in accordance with the present invention, in which the gripping element support 5 is deformed to such an extent in the area 10' that the discrete hard gripping elements 4 are able to adapt to suit the shape of the object 2.

Benefits may be derived if the gripping unit is made by processing raw materials in powder form to produce the gripping element and/or gripping element support in a single operation.

The invention is not, of course, restricted to the embodiments indicated above by way of examples, but may undergo modifications within the scope of the following Patent Claims.

I claim:

1. A gripping unit which by mechanical contact is adapted to interact with an object for maintaining a gripping surface belonging to the gripping unit in a fixed position relative to the object, said gripping unit comprising at least one gripping support connected to the at least one gripping element, a surface of the gripping unit facing the object having at least one hard, gripping element, each gripping element being joined directly to the gripping element support by a metallurgical atomic bond, the material used for the gripping element support being selected so as to exhibit considerable elastic rigidity and having the same or essentially the same modulus of elasticity as the material used for the gripping element, the gripping element support being a plastic deformable material whose elastic rigidity is at least 30% of the rigidity value of the at least one gripping element of the unit.

2. The gripping unit in accordance with claim 1, wherein each gripping element is joined to the gripping element support without an intermediate layer by diffusion bonding.

3. The gripping unit in accordance with claim 2, wherein the elastic rigidity value is at least 50% of the rigidity value of the at least one gripping element of the unit.

4. The gripping unit in accordance with claim 1 wherein the shape of the gripping elements of the unit and their positions on the gripping element support are adapted to fit the object with which the gripping unit is intended to be used.

5. The gripping unit in accordance with claim 1, wherein the gripping unit as a whole is intended to be substituted for another type of gripping unit.

6. The gripping unit in accordance with claim 1, wherein the rigidity value of the plastic deformable material is at least 90% of the rigidity value of the at least one gripping element of the unit.

7. The gripping unit in accordance with claim 1, wherein the plastic deformable material principally consists of the same basic chemical substance as the at least one gripping element of the device.

8. The gripping unit in accordance with claim 1, wherein only a single gripping element is included in each gripping unit, said gripping element having a geometrical form such that said gripping element support may undergo considerable deformation.

9. The gripping unit in accordance with claim 1, wherein said gripping elements are formed from raw materials in powder form.

10. The gripping unit in accordance with claim 1, wherein the rigidity value of the plastic deformable material is at least 95% of the rigidity value of the at least one gripping element of the unit.

11. The gripping unit in accordance with claim 1, wherein said gripping element support is formed from raw materials in powder form.

* * * * *